United States Patent
Ochiai

(10) Patent No.: US 9,735,875 B2
(45) Date of Patent: *Aug. 15, 2017

(54) FIELD DEVICE AND COMMUNICATION SYSTEM

(75) Inventor: Satoru Ochiai, Musashino (JP)

(73) Assignee: Yokogawa Electric Corporation, Musashino-shi, Tokyo (JP)

(*) Notice: Subject to any disclaimer, the term of this patent is extended or adjusted under 35 U.S.C. 154(b) by 358 days.

This patent is subject to a terminal disclaimer.

(21) Appl. No.: 14/241,675

(22) PCT Filed: Sep. 7, 2012

(86) PCT No.: PCT/JP2012/072939
§ 371 (c)(1),
(2), (4) Date: Feb. 27, 2014

(87) PCT Pub. No.: WO2013/039008
PCT Pub. Date: Mar. 21, 2013

(65) Prior Publication Data
US 2014/0212143 A1  Jul. 31, 2014

(30) Foreign Application Priority Data
Sep. 12, 2011 (JP) .................. 2011-198317

(51) Int. Cl.
*H04B 10/00* (2013.01)
*H04B 10/40* (2013.01)
(Continued)

(52) U.S. Cl.
CPC ......... *H04B 10/40* (2013.01); *G05B 19/0423* (2013.01); *G08C 23/04* (2013.01);
(Continued)

(58) Field of Classification Search
CPC .... H04B 10/40; H04B 10/11; H04B 10/1123; H04B 10/2575

USPC .......... 398/115, 128, 130, 135, 33, 118, 119, 398/120, 131, 127, 25; 455/456.1, 127.1, 455/522; 340/870.02, 539.1, 538
See application file for complete search history.

(56) References Cited

U.S. PATENT DOCUMENTS 7,233,745 B2 * 6/2007 Loechner ........... G05B 19/4185
340/539.1
8,981,960 B2 * 3/2015 Sakurai ............... H04L 41/0813
340/501

(Continued)

FOREIGN PATENT DOCUMENTS

JP          8-161608 A       6/1996
JP       2000-138700 A      5/2000
(Continued)

OTHER PUBLICATIONS

International Search Report of PCT/JP2012/072939, dated Nov. 27, 2012.
(Continued)

*Primary Examiner* — Hanh Phan
(74) *Attorney, Agent, or Firm* — Sughrue Mion, PLLC

(57) ABSTRACT

A field device provided with a first communication unit for communicating over a communication network, a second communication unit for communicating via infrared with an external device, a converter for converting a message transmitted by the external device and received by the second communication unit into data that can be transmitted over the communication network, and a first controller for controlling the first communication unit and transmitting the data converted by the converter to the communication network.

15 Claims, 6 Drawing Sheets

(51) Int. Cl.
  *G08C 23/04*   (2006.01)
  *H04B 10/11*   (2013.01)
  *H04Q 9/00*    (2006.01)
  *G05B 19/042*  (2006.01)
  *G05B 19/418*  (2006.01)

(52) U.S. Cl.
  CPC .............. *H04B 10/11* (2013.01); *H04Q 9/00* (2013.01); *G05B 19/4185* (2013.01); *G05B 2219/25428* (2013.01); *G05B 2219/31369* (2013.01); *G05B 2219/33192* (2013.01); *G08C 2201/40* (2013.01); *H04Q 2209/823* (2013.01)

(56) References Cited

U.S. PATENT DOCUMENTS

2005/0289276 A1* 12/2005 Karschnia .......... G05B 19/4185
                                                          710/305
2009/0097502 A1   4/2009  Yamamoto
2012/0002605 A1*  1/2012  Yoshino ............ H04W 52/0229
                                                          370/328
2012/0026657 A1*  2/2012  Yoshino ............. G05B 19/4185
                                                          361/679.01

FOREIGN PATENT DOCUMENTS

| | | |
|---|---|---|
| JP | 2000-295792 A | 10/2000 |
| JP | 2006-60696 A  | 3/2006  |
| JP | 2006-66999 A  | 3/2006  |
| JP | 2006-318148 A | 11/2006 |

OTHER PUBLICATIONS

"Wireless systems for industrial automation: Process control and related applications", ISA Standard, ISA-100.11a, 2009, pp. 1-817.

* cited by examiner

FIG. 3

| PARAMETER NUMBER | CONTENT |
|---|---|
| ⋮ | ⋮ |
| 0010 | MEASURED TEMPERATURE VALUE |
| ⋮ | ⋮ |
| 5001 | RECEIVED INFRARED MESSAGE |
| 5002 | TRANSMITTED INFRARED MESSAGE |
| ⋮ | ⋮ |
| 5010 | DISPLAYED MESSAGE |
| ⋮ | ⋮ |

FIELD DEVICE AND COMMUNICATION SYSTEM

CROSS REFERENCE TO RELATED APPLICATIONS

This application is a National Stage of International Application No. PCT/JP2012/072939 filed Sep. 7, 2012, claiming priority based on Japanese Patent Application No. 2011-198317, filed Sep. 12, 2011, the contents of all of which are incorporated herein by reference in their entirety.

TECHNICAL FIELD

The present invention relates to a field device and a communication system installed in a plant, a factory, or the like.

Priority is claimed on Japanese Patent Application No. 2011-198317, filed on Sep. 12, 2011, the content of which is incorporated herein by reference.

BACKGROUND ART

Conventionally, in order to implement advanced automation in a plant, a factory or the like, DCSs (distributed control systems) have been built, in which on-site devices such as measuring instruments and actuators, which are known as field devices, are connected via a communication means to a control apparatus that controls them. Although almost all of the communication systems forming the basis for such distributed control systems have been ones that communicate via cable, in recent years implementations that communicate wirelessly in conformance with wireless communication standards such as ISA 100.11a have appeared.

Communication systems conforming to the above-noted ISA 100.11a wireless communication standard are generally classified into field devices capable of wireless communication (wireless field devices), wireless gateways, and host apparatuses. A wireless gateway forms a wireless communication network with wireless field devices, and functions so as to control the operation of wireless field devices that belong to the wireless communication network and collect various data obtained by the wireless field devices. A host apparatus is connected to a wireless gateway via a communication line and manages wireless field devices via the wireless gateway.

In this case, in order to enable the above-noted wireless field device to join a wireless communication network, it is necessary to perform a task known as provisioning, which sets device information with respect to a wireless field device that is to join, as well as to perform a task of registration into the wireless gateway to be joined device information that identifies the wireless field device which has been the subject of the provisioning. The provisioning with respect to the wireless field device is performed, for example, by a worker, using a device known as a provisioning device, which is capable of infrared communication between itself and the wireless field device, and the task of registering into the wireless gateway is performed, for example, by an administrator, using the above-noted host apparatus.

A wireless field device in which device information coinciding with the device information registered into the wireless gateway is set is permitted to join the wireless communication network, and a wireless field device in which other device information is set is refused from joining the wireless communication network, by the wireless gateway. Although it is from a different field of art, Patent Document 1 noted below discloses art for controlling the transmission and reception of a temporary message between mobile communication terminals, which has the meaning of requesting execution of prescribed processing, in accordance with the position of a communication terminal.

PRIOR ART DOCUMENTS

Patent Documents

[Patent Document 1]
Japanese Unexamined Patent Application, First Publication No. 2006-66999

DISCLOSURE OF INVENTION

Problems to be Solved by the Invention

The host apparatus, which serves as a part of the above-described communication system, is almost always installed in a control room provided in a corner of a plant or the like, and there are even cases in which it is installed in a building different from the on-site building in which the field devices are installed. For this reason, in the current situation, when a worker performs work such as maintenance and inspection (for example, periodic inspection) of a field device, the work is done while contacting the administrator of the control room, using a mobile phone or the like. Although, in the case of a small plant or the like, because radio signals reach almost all regions of the plant, problems do not occur, if the size of the plant or the like is large, it is difficult for radio signals to provide coverage, and there is a possibility that maintaining contact between the worker and the administrator becomes difficult, which hinders the work.

Additionally, in order to prevent missed maintenance and inspection of field devices, work often proceeds in accordance with a checklist indicating a list of tasks to be performed. When work is performed in accordance with a checklist, a worker writes working results into the checklist when the task of each item is completed. However, the tasks of maintaining and inspecting field devices are monotonous and, depending upon the size of the plant or the like, the number of field devices that need to be inspected may become huge, and also, because of similarity between the outer appearance of field devices, this tends to lead to errors and omissions in marking the checklist When the work of maintaining and inspecting field devices is completed, because it is necessary to summarize the results of the work, a worker needs to input the details from the checklist into a computer, and use spreadsheet software or the like to perform the task of compiling the results of the work. Because the worker does this work manually, however, input or compilation errors tend to occur.

The present invention provides a field device and a communication system capable of performing tasks related to maintenance and inspection both efficiently and accurately.

Means for Solving the Problems

A field device may include: a first communication unit configured to perform communication via a communication network; a second communication unit configured to perform infrared communication with an external device; a converter configured to convert a message, which has been transmitted from the external device and has been received by the second communication unit, into data which is transmittable to the communication network; and a first controller configured to control the first communication unit to transmit the data, which has been converted by the converter, to the communication network.

The converter may be configured to convert the message, which has been received by the second communication unit, into alert data for notifying of an abnormality via the communication network.

The field device may further include: a second controller configured to control the second communication unit to transmit to the external device a message which has been transmitted via the communication network and has been received by the first communication unit, the message indicating that transmission should be done to the external device.

The field device may further include: a display controller configured to perform control to display on a display unit a message which has been transmitted via the communication network and has been received by the first communication unit, the message indicating that the display unit should make a display.

The field device may further include: a storage unit that stores a message received by the first and second communication units as parameters to which mutually different identifiers for each type are allocated, according to the type of message.

A communication system may include: a field device including: a first communication unit configured to perform communication via a communication network; a second communication unit configured to perform infrared communication with an external device; a converter configured to convert a message, which has been transmitted from the external device and has been received by the second communication unit, into data which is transmittable to the communication network; and a first controller configured to control the first communication unit to transmit the data, which has been converted by the converter, to the communication network; an external device configured to transmit the message by infrared communication to the field device; and a host apparatus configured to receive the data transmitted from the field device via the communication network.

The converter may convert the message, which has been received by the second communication unit, into alert data for notifying of an abnormality via the communication network.

The field device may further includes: a second controller configured to control the second communication unit to transmit to the external device a message which has been transmitted via the communication network and has been received by the first communication unit, the message indicating that transmission should be done to the external device.

The field device may further includes: a display controller configured to perform control to display on a display unit a message which has been transmitted via the communication network and has been received by the first communication unit, the message indicating that the display unit should make a display.

The field device may further includes: a storage unit that stores a message received by the first and second communication units as parameters to which mutually different identifiers for each type are allocated, according to the type of message.

A communication method in a field device including a first communication unit performing communication via a communication network; and a second communication unit performing infrared communication with an external device, may include: converting a message, which has been transmitted from the external device and has been received by the second communication unit, into data which is transmittable to the communication network; and controlling the first communication unit to transmit the data, which has been converted by the converter, to the communication network.

A communication method may further include: converting the message, which has been received at the second communication unit, into alert data for notifying of an abnormality via the communication network.

A communication method may further include: controlling the second communication unit to transmit to the external device a message which has been transmitted via the communication network and has been received by the first communication unit, the message indicating that transmission should be done to the external device.

A communication method may further include: performing control to display on a display unit a message which has been transmitted via the communication network and has been received by the first communication unit, the message indicating that the display unit should make a display.

A communication method may further include: storing a message received by the first and second communication units as parameters to which mutually different identifiers for each type are allocated, according to the type of message.

Effects of the Invention

An embodiment of the present invention converts, by a converter, a message received by a second communication unit that has been transmitted from an external device to data transmittable to a communication network and, by controlling a first communication unit by a first controller, transmits the data converted by the converter to the communication network. Because this enables transmission as a message to the communication network of the intent of a worker operating an external device, it enables efficient and accurate work related to maintenance and inspection.

BRIEF DESCRIPTION OF THE DRAWINGS

FIG. 3 is a drawing for describing the parameters used in a field device in accordance with an embodiment of the present invention.

EMBODIMENTS FOR CARRYING OUT THE INVENTION

Figure 1:
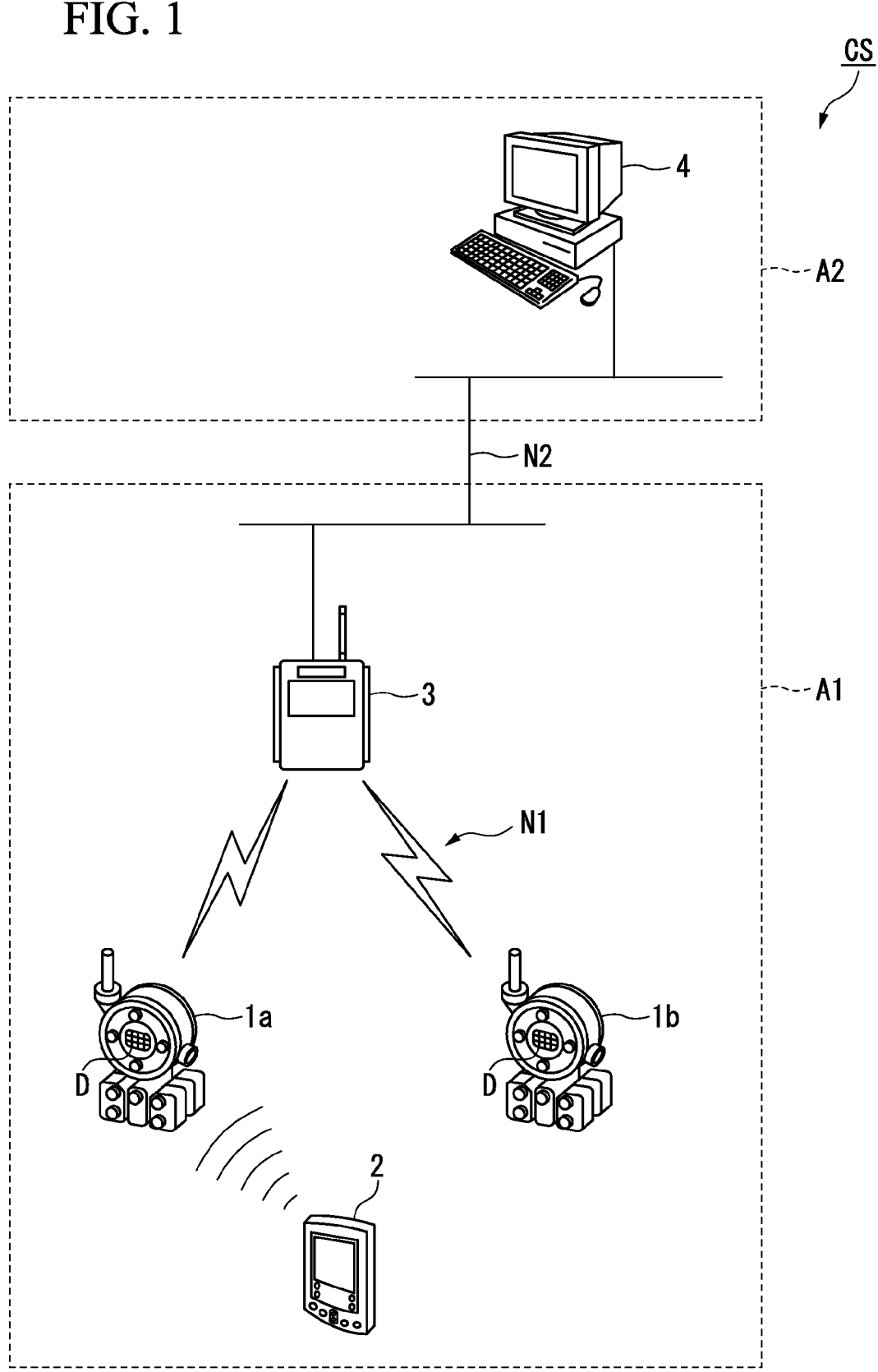
FIG. 1 is a block diagram illustrating the overall constitution of a communication system in accordance with an embodiment of the present invention.

A field device and a communication system in accordance with an embodiment of the present invention will be described in detail below, with references made to the drawings. FIG. 1 is a block diagram illustrating the overall constitution of a communication system in accordance with an embodiment of the present invention. As shown in FIG. 1, a communication system CS has wireless field devices 1a and 1b, a provisioning device 2 (external device), a wireless gateway 3, and a host apparatus 4. The communication system CS communicates via a wireless communication network N1 and a backbone network N2.

In FIG. 1, the rectangular region marked by the reference numeral A1 represents an on-site location in a plant or the like, in which the wireless field devices 1a and 1b and the wireless gateway 3 are installed. The rectangular region marked by the reference numeral A2 represents a control room provided in a corner of the plant or the like, in which the host apparatus 4 is installed. In the example shown in FIG. 1, because the control room A2 is separated by a distance from the on-site location A1, the on-site location A1 and the control room A2 are connected by the backbone network N2. Although two wireless field devices 1a and 1b are shown in FIG. 1, the number of wireless field devices is arbitrary.

The wireless field devices 1a and 1b are, for example, sensor devices such as flow gauges and temperature sensors, valve devices such as flow control valves or open/close valves, actuator devices such as fans and motors, and other devices installed in the plant or factory. Wireless field devices 1a and 1b perform wireless communication conforming to ISA 100.11a, which is an industrial automation wireless communication standard. The operation of the wireless field devices 1a and 1b is controlled based on control data transmitted from the host apparatus 4 via the wireless gateway 3. Measurement data obtained by the wireless field devices 1a and 1b is collected on the wireless gateway 3.

The wireless field devices 1a and 1b have an infrared communication function and can transmit and receive various information between themselves and an external infrared communication device. Specifically, the wireless field devices 1a and 1b communicate by infrared with the provisioning device 2 to obtain various setting information, or to transmit and receive messages with the provisioning device 2. The various setting information is, for example, information required to join the wireless communication network N1 formed by the wireless gateway 3. The wireless field devices 1a and 1b have a display apparatus D, such as a liquid-crystal display apparatus, on which various messages and device statuses are displayed to a worker performing provisioning. The details of the internal constitution of the wireless field devices 1a and 1b will be described later.

The provisioning device 2 is a terminal apparatus that can perform infrared communication with the wireless field devices 1a and 1b. The provisioning device 2 is operated by a worker installing or maintaining the wireless field devices 1a and 1b (performing maintenance and management). The provisioning device 2, in addition to making and changing settings of various information with respect to the wireless field devices 1a and 1b, transmits and receives messages. In this case, the setting information set in the wireless field devices 1a and 1b using the provisioning device 2 is information such as device information identifying the wireless field devices 1a and 1b (for example, information indicating name and model), and communication setting information for implementing wireless communication via the wireless communication network N1 (information indicating the address or the like of the wireless gateway 3).

Wireless gateway 3 connects the wireless communication network N1, to which the wireless field devices 1a and 1b are connected, with the backbone network N2, to which the host apparatus 4 is connected, and relays various data transmitted and received between the wireless field devices 1a and 1b and the host apparatus 4. The wireless gateway 3 is capable of wireless communication conforming to the above-noted ISA 100.11a wireless communication standard. The wireless gateway 3 controls wireless communication performed via the wireless communication network N1, and joining processing of whether or not a wireless field device is to be allowed to join the wireless communication network N1.

The host apparatus 4 is connected to the backbone network N2, which is a cable network. The host apparatus 4 is, for example, an apparatus operated by the administrator of the communication system CS. The host apparatus 4, in response to operations by the administrator, communicates with the wireless gateway 3, obtains information regarding the wireless field devices 1a and 1b (for example, measurement data and information indicating abnormalities (alarms)), and uses this in managing the wireless field devices 1a and 1b.

Figure 2:
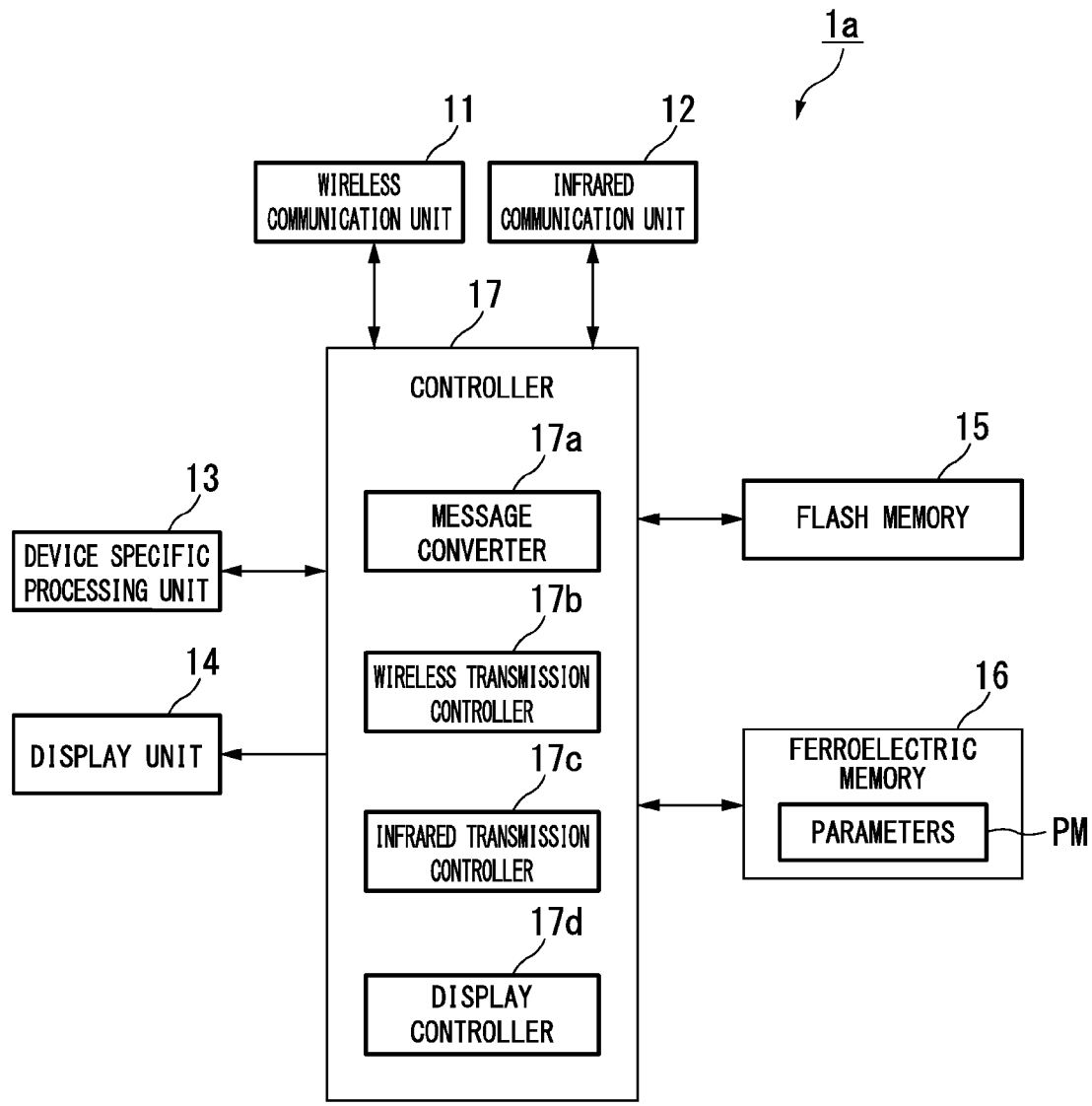
FIG. 2 is a block diagram illustrating the main constituent elements of a field device in accordance with an embodiment of the present invention.

Next, the details of the internal constitution of the wireless field devices 1a and 1b will be described. FIG. 2 is a block diagram illustrating the main constituent elements of a field device in accordance with an embodiment of the present invention. Because wireless field devices 1a and 1b have the same type of constitution, the following will be a description of only the wireless field device 1a, the description of the wireless field device 1b being omitted. In FIG. 2, of the constituent elements provided in the wireless field device 1a, only those elements that are required to describe the present invention are illustrated.

As shown in FIG. 2, the wireless field device 1a has a wireless communication unit 11 (first communication unit), an infrared communication unit 12 (second communication unit), a device specific processing unit 13, a display unit 14, a flash memory 15, a ferroelectric memory 16 (storage unit), and a controller 17. The wireless communication unit 11 performs wireless communication with the wireless gateway 3, via the wireless communication network N1, under the control of the controller 17. This communication conforms with the ISA 100.11a wireless communication standard. The infrared communication unit 12 performs infrared communication with the provisioning device 2 under the control of the controller 17, obtains various setting information, and transmits and receives messages.

The device specific processing unit 13 performs processing specific to the wireless field device 1a, under the control of the controller 17. In this case, processing specific to the wireless field device 1a is, for example, temperature measurement processing, valve opening/closing processing, and actuator operation processing. In the present embodiment, a temperature sensor is provided in the device specific processing unit 13, and processing to measure the temperature is performed as the above-noted device specific processing. The display unit 14 has the display apparatus D shown in FIG. 1. The display unit 14, under the control of the controller 17, displays various messages and device statuses on the display apparatus D for the worker performing provisioning.

The flash memory 15 is a non-volatile semiconductor memory that stores a program (not shown) that governs the operation of the wireless field device 1a. The ferroelectric memory 16 is a non-volatile semiconductor memory making use of the hysteresis effect of a ferroelectric body, and is known as a FeRAM (ferroelectric random-access memory). The ferroelectric memory 15 stores various parameters PM used by the wireless field device 1a.

FIG. 3 describes the parameters used in the field devices in accordance with an embodiment of the present invention. The parameters PM store various types of information, such as information regarding the control of the wireless field device 1a, information regarding measurement values, and various other information used in the wireless field device 1a. These parameters PM, as shown in FIG. 3, have parameter numbers (identifiers) allocated thereto that are mutually different, for each type of information (content) stored therein.

In the example shown in FIG. 3, the parameter allocated the parameter number "0010" stores the measured value of temperature in the device specific processing unit 13. The parameter allocated the parameter number "5001" stores a message received by the infrared communication unit 12, and the parameter allocated the parameter number "5002" stores a message that should be transmitted from the infrared communication unit 12. The parameter allocated the parameter number "5010" stores a message that should be displayed on the display unit 14.

The controller 17 has a message converter 17a (converter), a wireless transmission controller 17b (first controller), an infrared transmission controller 17c (second controller), and a display controller 17d. The controller 17 performs overall control of the wireless field device 1a. The message converter 17a converts a message transmitted from the provisioning device 2 and received at the infrared communication unit 12 (the message, of the messages stored in the parameters PM, stored in the parameter to which the parameter number "5001" is allocated as shown in FIG. 3) to data transmittable to the wireless communication network N1. Specifically, the message received at the infrared communication unit 12 is converted to alert data, which is data for notification to the host apparatus 4 of an abnormality, via the wireless communication network N1.

This conversion is done to make the message from the provisioning device 2 transmittable from the wireless field device 1a to the host apparatus 4. In this case, because the wireless field device 1a is being controlled by the host apparatus 4, it basically cannot transmit a message from the provisioning device 2 to the host apparatus 4 on its own. However, with regard to an alert indicating that an abnormality has occurred, because the field device 1a can autonomously transmit to the host apparatus 4, in the present embodiment transmission of a message to the host apparatus 4 is enabled by converting the message from the provisioning device 2 to alert data.

The wireless transmission controller 17b controls the wireless communication unit 11 so as to transmit the alert data converted by the message converter 17a to the wireless communication network N1. The infrared transmission controller 17c controls the infrared communication unit 12 to transmit to the provisioning device 2 a message, of messages transmitted from the host apparatus 4 via the wireless communication network N1 and received by the wireless communication unit 11, indicating that transmission should be done to the provisioning device 2. In this case, the message indicating that transmission should be done to the provisioning device 2 is, of the messages stored in the parameters PM, a message stored in the parameter to which the parameter number "5002" is allocated as shown in FIG. 3.

The display controller 17d performs control to display on the display unit 14 a message, of messages transmitted from the host apparatus 4 via the wireless communication network N1 and received by the wireless communication unit 11, indicating that the display unit 14 should make a display. In this case, the message indicating that the display unit 14 should make a display is, of the messages stored in the parameters PM, a message stored in the parameter PM to which the parameter number "5010" is allocated as shown in FIG. 3.

In this case, although the functionality of the above-described controller 17 (the message converter 17a to the display controller 17d) can be implemented by hardware, it may alternatively be implemented by software. That is, it may be implemented by having a computer execute a program implementing the functionality of the message converter 17a to the display controller 17d. For example, a program implementing the functionality of the message converter 17a to the display controller 17d can be recorded in a recording medium, and the program recorded in the recording medium can be installed into a computer by using a drive apparatus capable of reading out the data recorded in the recording medium, so as to implement the functionality of the message converter 17a to the display controller 17d.

Alternatively, a computer may be connected to a network such as the Internet, and a program similar to one recorded in a recording medium may be downloaded to the computer from the network. The program downloaded to the computer may be installed into the computer in the same manner as the case of reading from a computer-readable recording medium using the above-noted drive apparatus.

Figure 4:
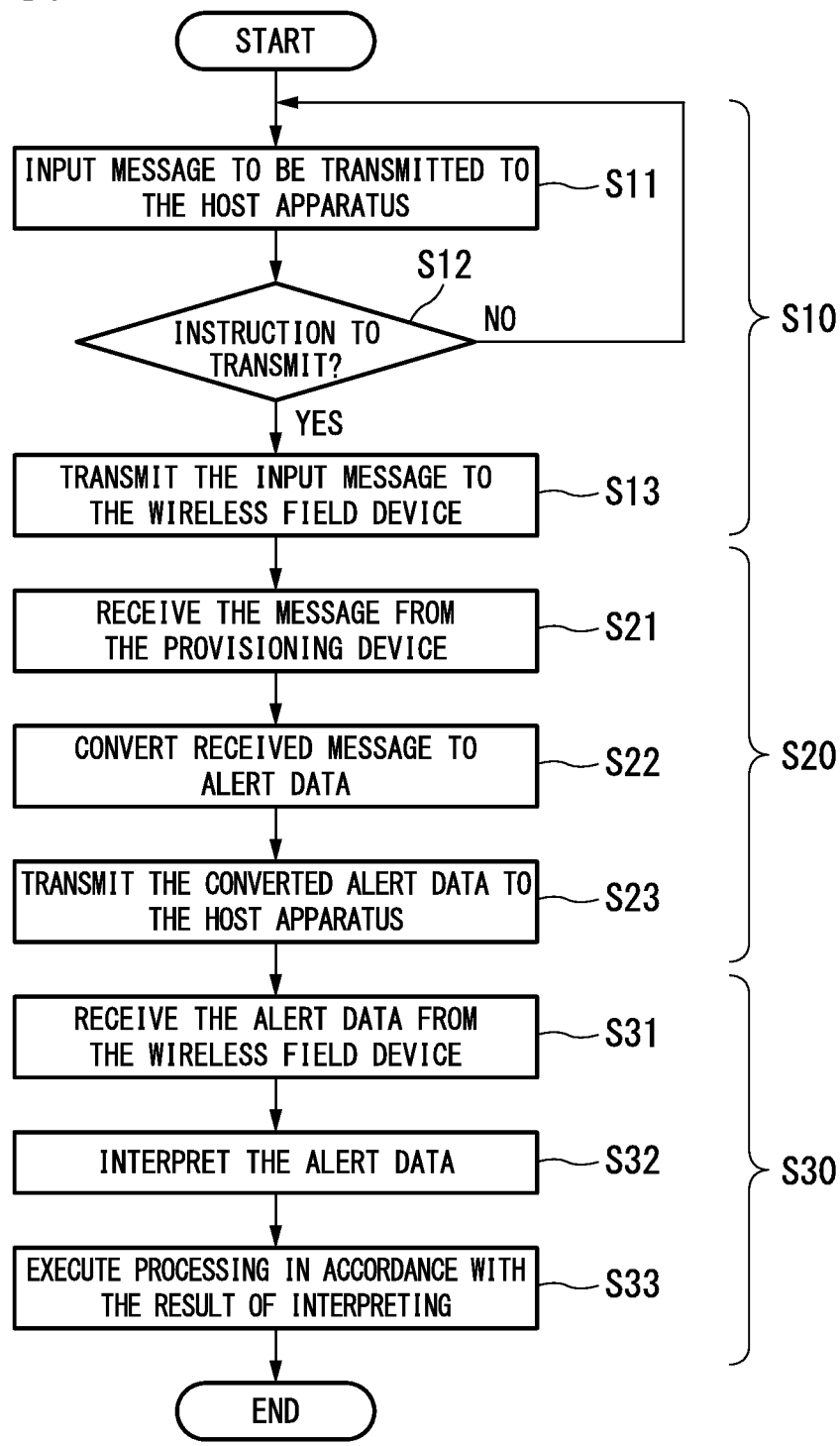
FIG. 4 is a flowchart for describing the operation of a communication system in accordance with an embodiment of the present invention.
Figure 5:
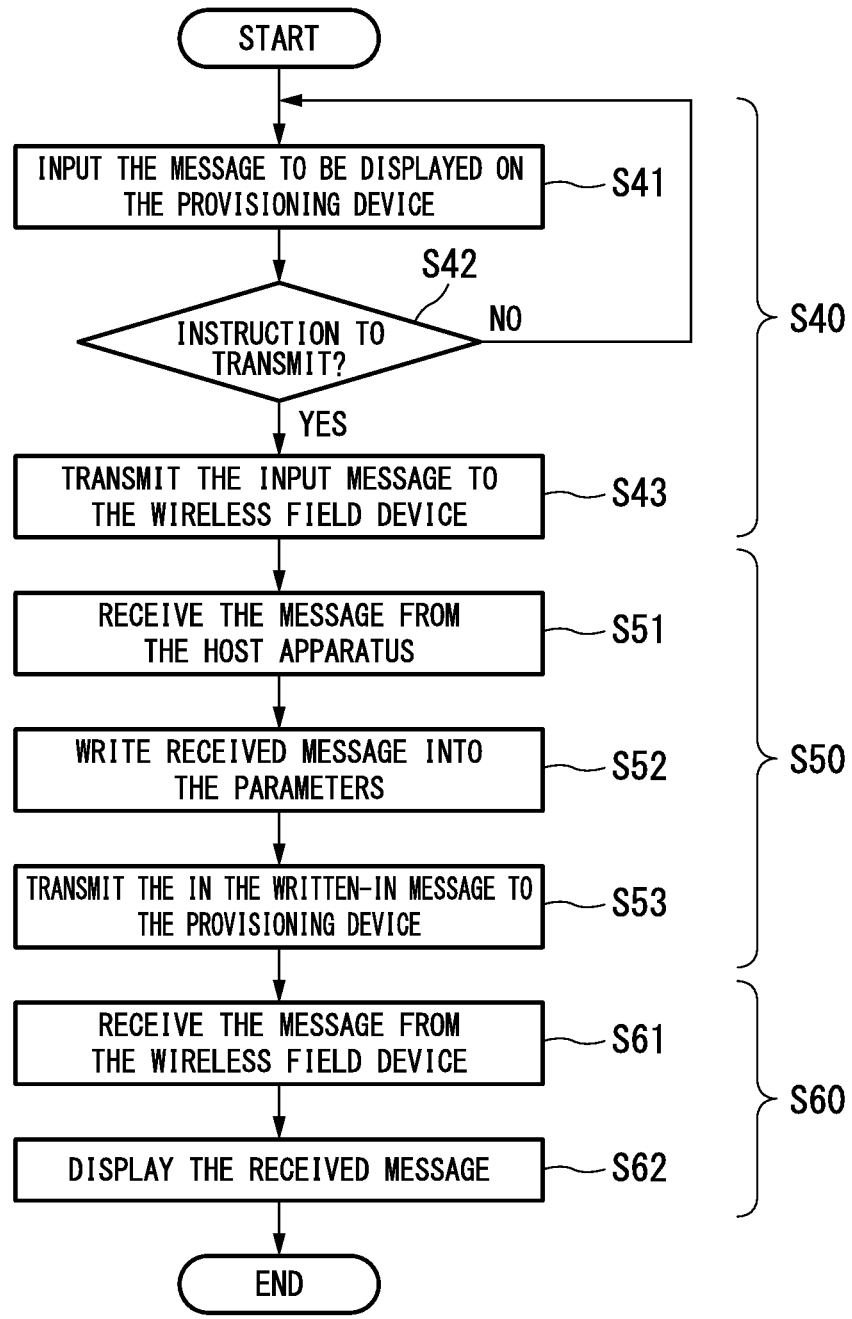
FIG. 5 is a flowchart for describing the operation of a communication system in accordance with an embodiment of the present invention.
Figure 6:
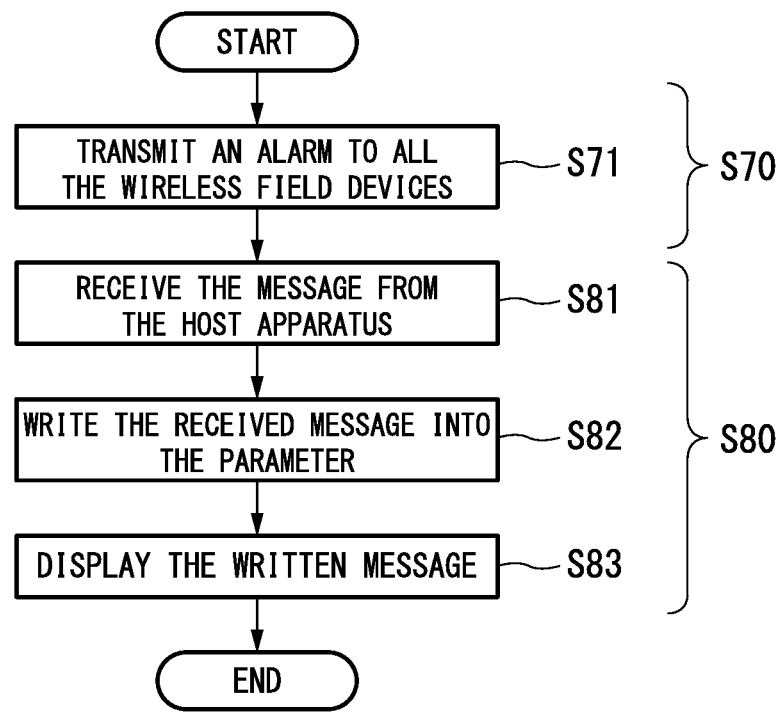
FIG. 6 is a flowchart for describing the operation of a communication system in accordance with an embodiment of the present invention.

Next, the operation performed in the communication system in the above-noted constitution will be described. FIG. 4 to FIG. 6 are flowcharts for describing the operation of the communication system in accordance with an embodiment of the present invention. In this case, the operation of the communication system CS in the present embodiment will be generally divided into the operation of transmitting a message from the provisioning device 2 to the host apparatus 4 (hereinafter "message transmission operation"), and the operation of the host apparatus 4 causing the display of a message by the wireless field devices 1a and 1b or the provisioning device 2 (hereinafter "message display operation").

The flowchart of FIG. 4 describes the above-noted message transmission operation. In contrast, the flowchart of FIG. 5, of the above-noted message display operation, describes the operation of the host apparatus 4 causing the display of a message by the provisioning device 2. The flowchart of FIG. 6, of the above-noted message display operation, describes the operation of the host apparatus 4 causing the display of a message by the wireless field devices 1a and 1b. Each of these operations will be described in sequence below, with references made to FIG. 4 to FIG. 6.

(Message Transmission Operation)

The processing shown in the flowchart of FIG. 4 is started, for example, by a worker operating the provisioning device 2 when maintenance work of the wireless field device 1a is completed in accordance with a checklist In the message transmission operation, steps S10, S20, and S30 in FIG. 4 indicate, respectively, the operation at the provisioning device 2, the operation at the wireless field device 1a, and the operation at the host apparatus 4.

First, at step S11, the worker operates the provisioning device 2 and the input message to be transmitted to the host apparatus 4 is processed. Next, at step S12, the provisioning device 2 judges whether or not there has been an instruction to transmit the input message. If the judgment is that a transmission instruction has not been made (NO judgment result at step S12), the processing of step S11 is continued. If, however, the judgment is that there was a message transmission instruction made (YES judgment result at step S12), at step S13 processing is performed to transmit the input message by infrared communication to the wireless field device 1a.

When the message is transmitted from the provisioning device 2, at step S21, processing to receive the message is performed by the infrared communication unit 12 of the wireless field device 1a. The controller 17 performs control to store the message received at the infrared communication unit 12 in a parameter PM of the ferroelectric memory 16 (specifically, in the parameter allocated the parameter number "5001" as shown in FIG. 3).

At step S22, the message stored in the parameter PM is read out by the message converter 17a of the controller 17 and is converted to data transmittable to the wireless communication network N1 (specifically, alert data for notifying the host apparatus 4 of an abnormality). Then, at step S23, the wireless communication unit 11 is controlled by the wireless transmission controller 17b of the controller 17 so as to transmit the alert data converted by the message converter 17a to the host apparatus 4.

At step S31, the alert data transmitted from the wireless field device 1a is received by the host apparatus 4 via, in sequence, the wireless communication network N1, the wireless gateway 3, and the backbone network N2. Upon receiving the alert data from the wireless field device 1a, at step S32 the host apparatus 4 interprets the received alert data. At step S33, processing is executed in accordance with the results of interpreting the alert data. For example, if the alert data is interpreted to be simply a message, the message is display on a display apparatus provided on the host apparatus 4. Alternatively, if the host apparatus 4 has a log recording function, the message is recorded as a log. If the worker inputs the results of work to the provisioning device 2 as a message, the results of the work are then recorded as a log in the host apparatus 4.

(Message Display Operation)

The processing shown in the flowchart of FIG. 5 is started, for example, when an administrator who has referenced the content displayed by a message transmission operation as described above on the host apparatus 4 display apparatus operates the host apparatus 4. In the message display operation (operation whereby the host apparatus 4 causes display of a message by the provisioning device 2), steps S40, S50, and S60 in FIG. 5 indicate, respectively, the operation at the host apparatus 4, the operation at the wireless field device 1a, and the operation at the provisioning device 2.

First, at step S41, the administrator operates the host apparatus 4 and the input message to be displayed on the provisioning device 2 is processed. Next, at step S42, the host apparatus 4 judges whether or not there has been an instruction to transmit the input message. If the judgment is that a transmission instruction has not been made (NO judgment result at step S42), the processing of step S41 is continued. If, however, the judgment is that there was a message transmission instruction made (YES judgment results at S42), at step S43, processing is performed to transmit the input message to the wireless field device 1a.

When the message is transmitted from the host apparatus 4, at step S51, processing to receive the message is performed by the wireless communication unit 11 of the wireless field device 1a. At step S52, the controller 17 performs control to store the message received at the wireless communication unit 11 in a parameter PM of the ferroelectric memory 16 (specifically, in the parameter allocated the parameter number "5002" as shown in FIG. 3).

The message stored in the parameter PM is read out by the infrared transmission controller 17c of the controller 17. Then, at step S53, the infrared communication unit 12 is controlled by the infrared transmission controller 17c of the controller 17 so as to transmit the read-out message to the provisioning device 2 by infrared communication. At step S61, the provisioning device 2 receives the message transmitted by infrared communication from the wireless field device 1a. At step S62, the received message is displayed on the display apparatus of the provisioning device 2.

The processing shown in the flowchart of FIG. 6 is started, for example, in the case in which the content of a message transmitted to the host apparatus 4 by a message transmission operation as described above is interpreted as one for which an alarm must be transmitted to all the wireless field devices 1a and 1b. In the message display operation (the operation of the host apparatus 4 causing the display of a message by the wireless field devices 1a and 1b) steps S70 and S80 in FIG. 5 indicate, respectively, to the operation performed by the host apparatus 4 and the operation performed by the wireless field device 1a.

First, when the processing is started, at step S71, processing to transmit an alarm to all the wireless field devices 1a and 1b is performed by the host apparatus 4. At step S81, the alarm transmitted from the host apparatus 4 is received at the wireless field devices 1a and 1b via, in sequence, the backbone network N2, the wireless gateway 3, and the wireless communication network N1.

At step S82, the controller 17 of each of the wireless field devices 1a and 1b performs control to store the alarm received at the wireless field devices 1a and 1b in a parameter PM of the ferroelectric memory 16 (specifically, in the parameter allocated the parameter number "5010" as shown in FIG. 3). At step S83, the messages stored in the parameters PM are read out and displayed on the display units 14 by the display controllers 17d of the controllers 17 of each of the wireless field devices 1a and 1b. In this manner, the alarm transmitted from the host apparatus 4 is displayed on the display units 14 of the wireless field devices 1a and 1b, so that the worker seeing the display of the display unit 14 can take the called-for action such as evacuation in accordance with the display content.

As described above, in the present embodiment, a message transmitted from the provisioning device 2 to the wireless field device 1a by infrared communication is converted to data (alert data) transmittable by the wireless field device 1a to the wireless communication network N1 and then transmitted to the wireless communication network N1 to the host apparatus 4. The message transmitted to the wireless field device 1a from the host apparatus 4 is transmitted to the provisioning device 2 by infrared communication and displayed on the provisioning device 2.

Doing this enables communication of intentions between the worker performing maintenance and inspection of the wireless field devices 1a and 1b and the administrator via the provisioning device 2, while solving the conventional problem of lack of radio signal coverage such as when communication was done by mobile telephones or the like. Additionally, because the content input to the provisioning device 2 by the worker can be recorded in the host apparatus 4 as, for example, a log, it is possible to reduce errors in notation, input, and totalization compared with the conventional method of making notations of the results of work in a checklist In this manner, the present embodiment enables maintenance and inspection work that is both more efficient and more accurate than that of the conventional one.

Although the foregoing has been a description of a field device and a communication system in accordance with an embodiment of the present invention, the present invention is not restricted to the above-described embodiment, and can be freely modified within the scope thereof. For example, in the above-noted embodiment, the example of the case has been that of a worker at the on-site location A1 using the provisioning device 2 to transmit a message to the host apparatus 4, so as to communicate intent between the worker and the administrator in the control room A2. However, by specifying the transmission destination of the message as a wireless field device, it is possible to communicate intent between workers in the on-site location A1 via the provisioning device 2.

In this case, because the passing of a message between workers at the on-site location A1 is always performed via the wireless gateway 3, the administrator can monitor the messages passed between workers, using the host apparatus 4. Doing this enables the establishment of security, and enables the administrator to monitor whether or not a worker has made an erroneous operation.

Although in the above-noted embodiment the example of wireless field devices 1a and 1b capable of wireless communication conforming to the ISA 100.11a wireless communication standard has been described, the present invention may be applied as well to field devices performing communication by a cable network.

INDUSTRIAL APPLICABILITY

The present invention is widely applicable to field devices and communication systems installed in, for example, plants and factories and, because it can transmit the intent of a worker operating an external device as a message to a communication network, can perform work related to maintenance and inspection with good efficiency and accuracy.

DESCRIPTION OF THE REFERENCE SYMBOLS 1a, 1b Wireless field device
2 Provisioning device (external device)
3 Wireless gateway
4 Host apparatus
11 Wireless communication unit (first communication unit)
12 Infrared communication unit (second communication unit)
13 Device specific processing unit
14 Display unit
15 Flash memory
16 Ferroelectric memory (storage unit)
17 Controller
17a Message converter (converter unit)
17b Wireless transmission controller (first controller)
17c Infrared transmission controller (second controller)
17d Display controller
A1 On-site location
A2 Control room
CS Communication system
D Display apparatus
N1 Wireless communication network
N2 Backbone network
PM Parameter

The invention claimed is:

1. A field device comprising:
   a first communication unit configured to perform communication via a communication network;
   a second communication unit configured to perform infrared communication with an external device;
   a converter configured to convert a message, which has been transmitted from the external device and has been received by the second communication unit, into alert data which is transmittable to the communication network, the alert data notifying of an abnormality via the communication network; and
   a first controller configured to control the first communication unit to transmit the alert data, which has been converted by the converter, to the communication network.

2. The field device according to claim 1, wherein transmission of the message to the communication network is enabled by converting the message into the alert data.

3. The field device according to claim 1, further comprising:
   a second controller configured to control the second communication unit to transmit to the external device a message which has been transmitted via the communication network and has been received by the first communication unit, the message indicating that transmission should be done to the external device.

4. The field device according to claim 1, further comprising:
   a display controller configured to perform control to display on a display unit a message which has been transmitted via the communication network and has been received by the first communication unit, the message indicating that the display unit should make a display.

5. The field device according to claim 1, further comprising:
   a storage unit that stores a message received by the first and second communication units as parameters to which mutually different identifiers for each type are allocated, according to the type of message.

6. A communication system comprising:
   a field device including:
      a first communication unit configured to perform communication via a communication network;
      a second communication unit configured to perform infrared communication with an external device;
      a converter configured to convert a message, which has been transmitted from the external device and has been received by the second communication unit, into alert data which is transmittable to the communication network, the alert data notifying of an abnormality via the communication network; and
      a first controller configured to control the first communication unit to transmit the alert data, which has been converted by the converter, to the communication network;
   an external device configured to transmit the message by infrared communication to the field device; and
   a host apparatus configured to receive the alert data transmitted from the field device via the communication network.

7. The communication system according to claim 6, wherein transmission of the message to the communication network is enabled by converting the message into the alert data.

8. The communication system according to claim 6, wherein the field device further includes:
  a second controller configured to control the second communication unit to transmit to the external device a message which has been transmitted via the communication network and has been received by the first communication unit, the message indicating that transmission should be done to the external device.

9. The communication system according to claim 6, wherein the field device further includes:
  a display controller configured to perform control to display on a display unit a message which has been transmitted via the communication network and has been received by the first communication unit, the message indicating that the display unit should make a display.

10. The communication system according to claim 6, wherein the field device further includes:
  a storage unit that stores a message received by the first and second communication units as parameters to which mutually different identifiers for each type are allocated, according to the type of message.

11. A communication method in a field device comprising a first communication unit performing communication via a communication network; and a second communication unit performing infrared communication with an external device, the communication method including:
  converting a message, which has been transmitted from the external device and has been received by the second communication unit, into alert data which is transmittable to the communication network, the alert data notifying of an abnormality via the communication network; and
  controlling the first communication unit to transmit the alert data, which has been converted by a converter, to the communication network.

12. A communication method according to claim 11, wherein transmission of the message to the communication network is enabled by converting the message into the alert data.

13. A communication method according to claim 11, further including:
  controlling the second communication unit to transmit to the external device a message which has been transmitted via the communication network and has been received by the first communication unit, the message indicating that transmission should be done to the external device.

14. A communication method according to claim 11, further including:
  performing control to display on a display unit a message which has been transmitted via the communication network and has been received by the first communication unit, the message indicating that the display unit should make a display.

15. A communication method according to claim 11, further including:
  storing a message received by the first and second communication units as parameters to which mutually different identifiers for each type are allocated, according to the type of message.

* * * * *